March 28, 1939.　　　O. E. SZEKELY　　　2,151,722
TORQUE AND SPEED TRANSMISSION DEVICE
Original Filed Nov. 19, 1934　　6 Sheets-Sheet 5

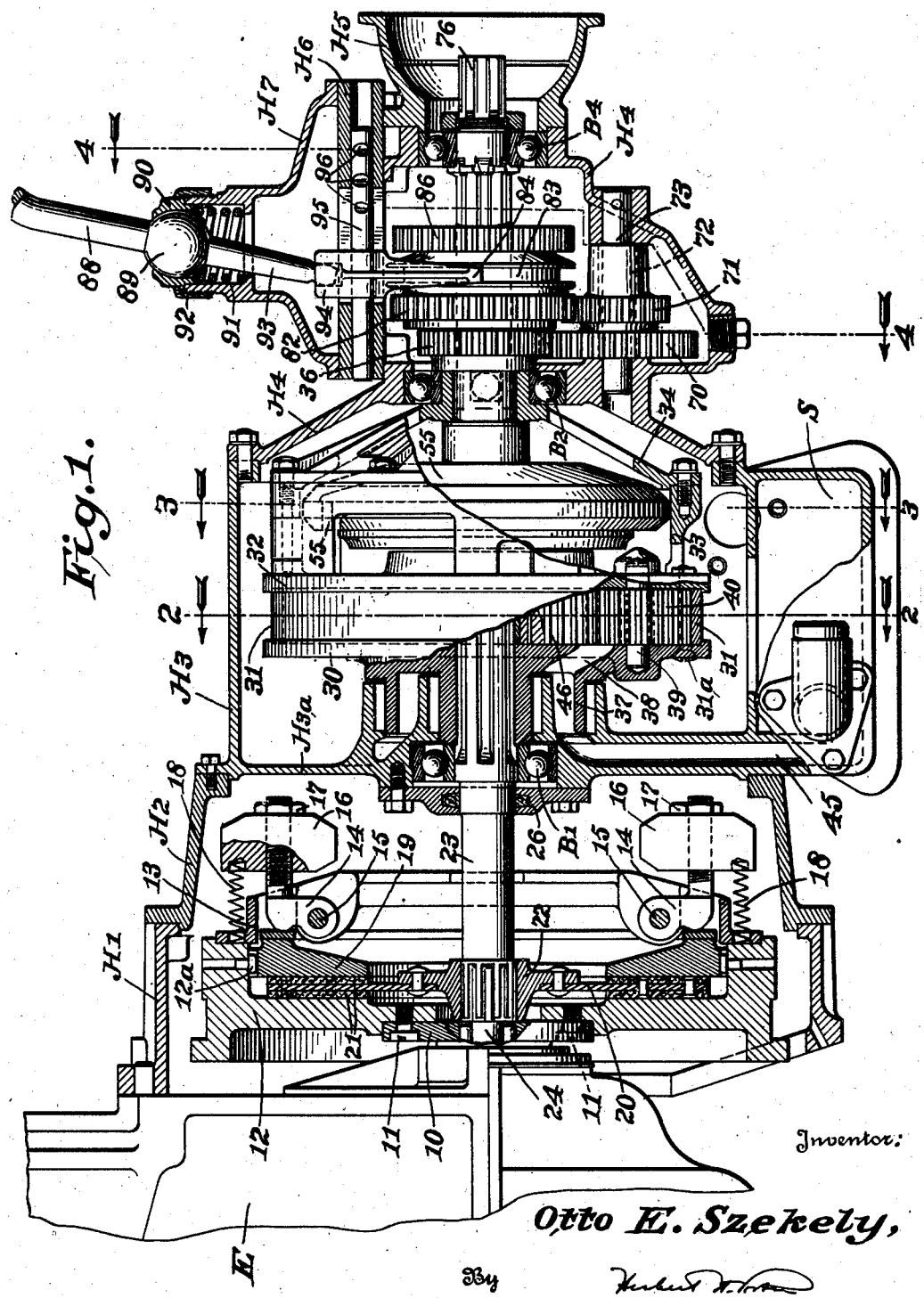

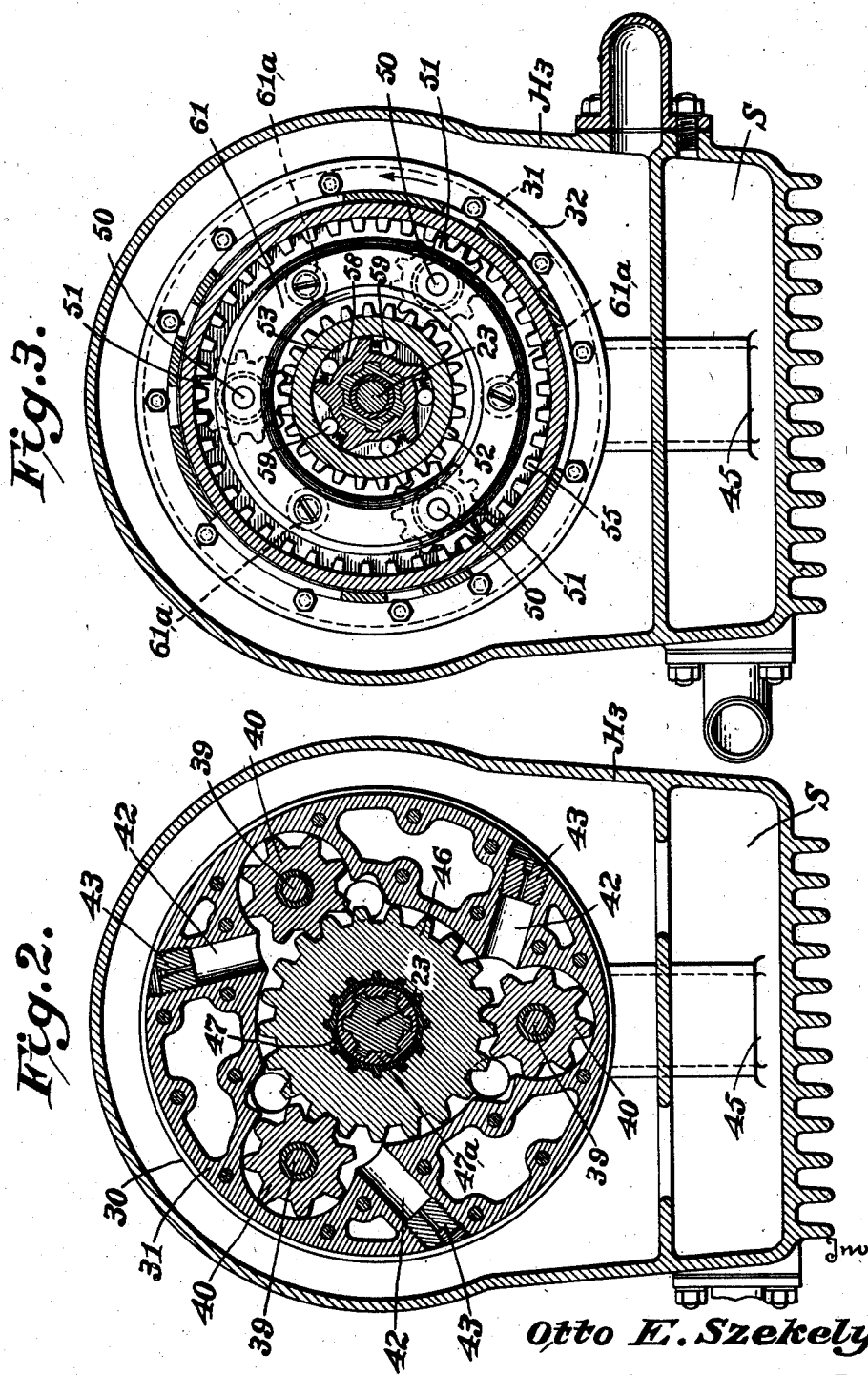

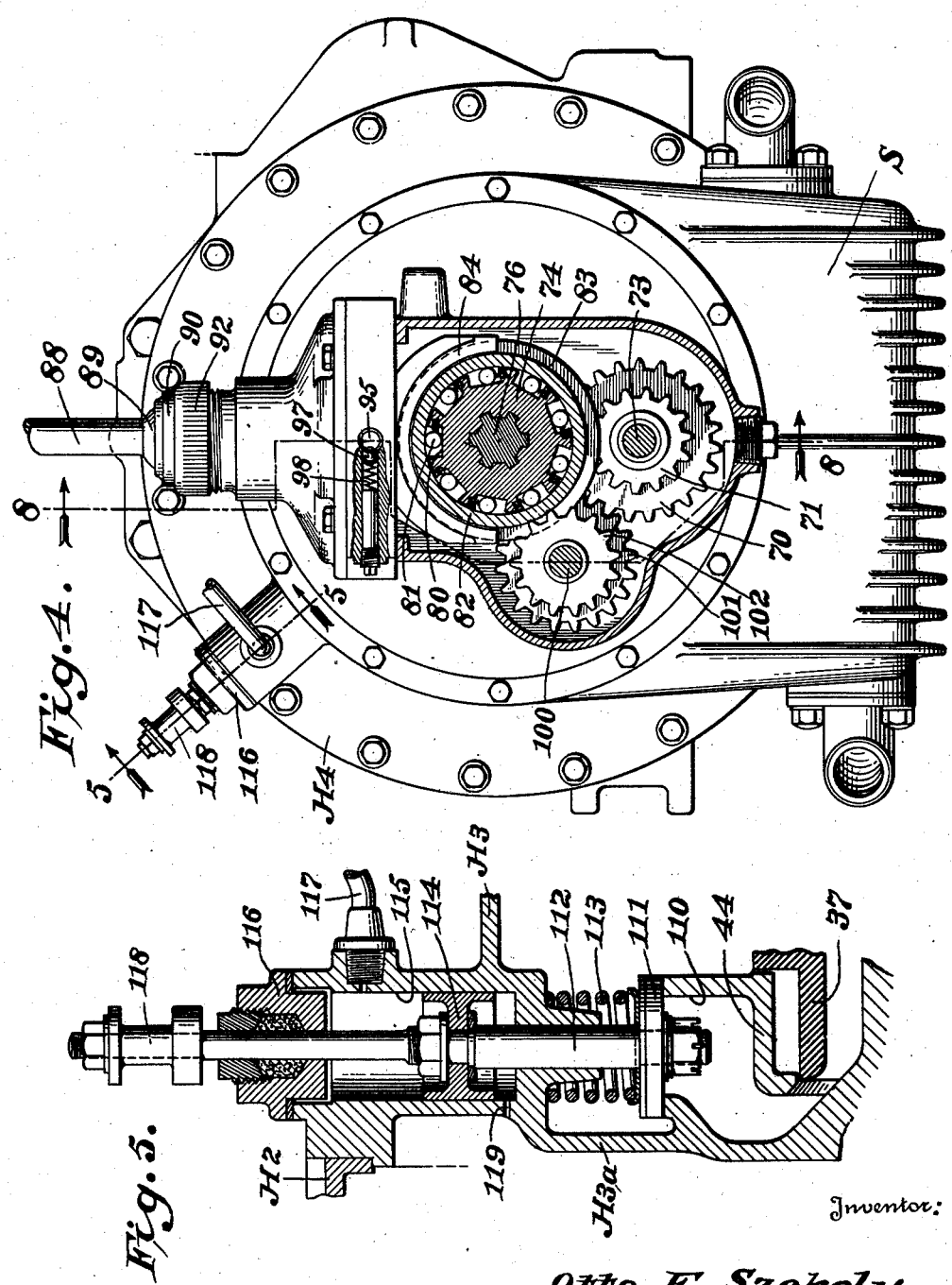

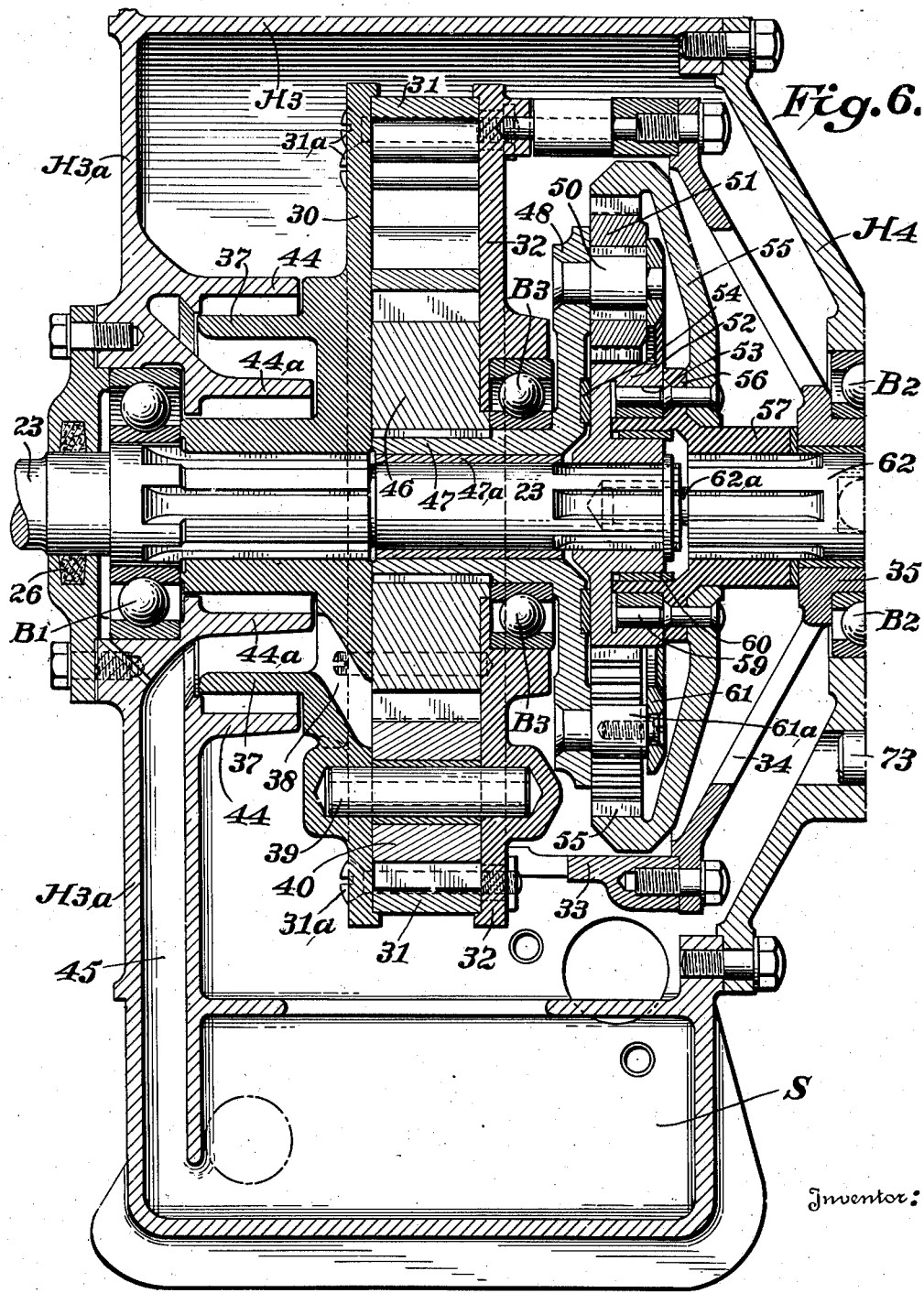

Inventor:
Otto E. Szekely,
By
Attorney.

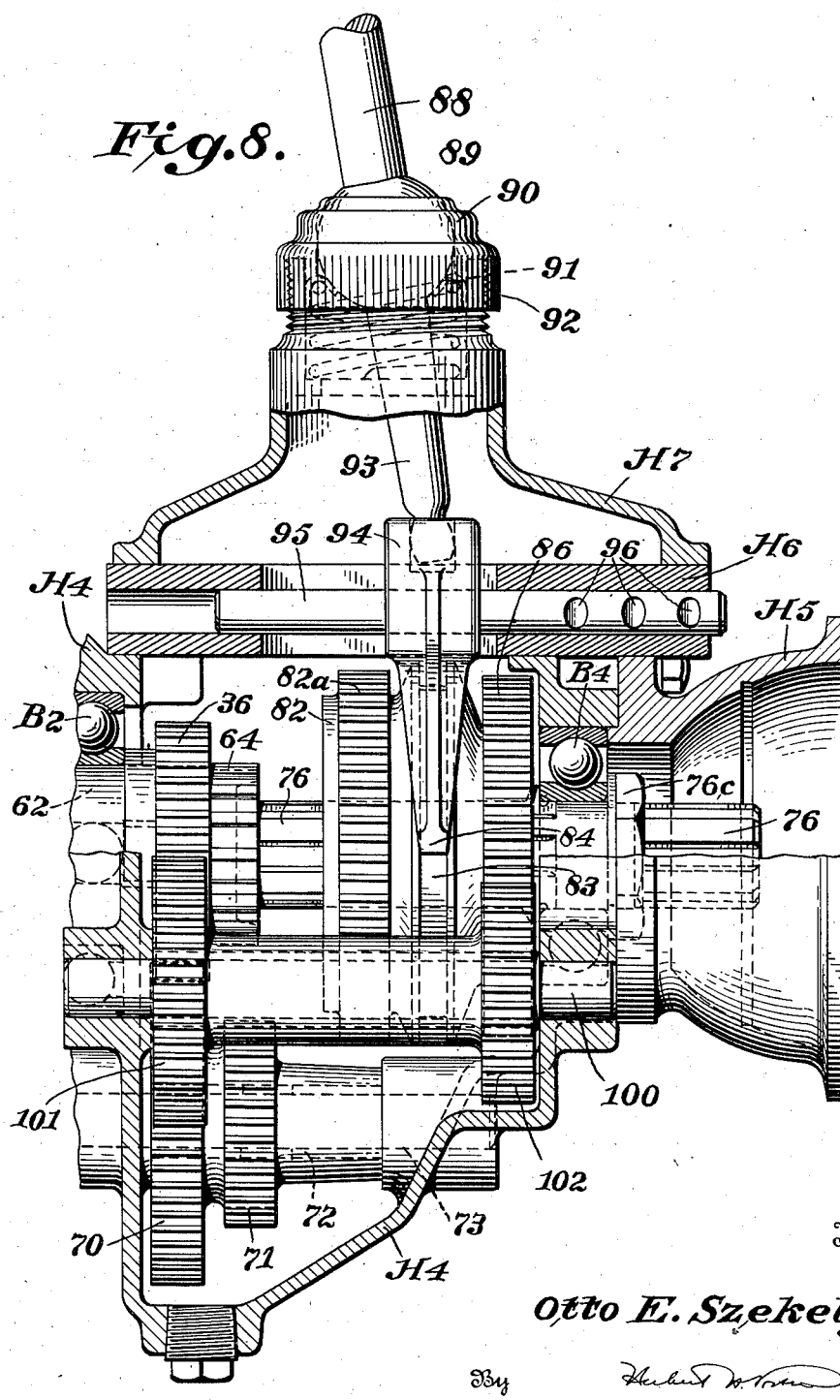

Patented Mar. 28, 1939

2,151,722

UNITED STATES PATENT OFFICE 2,151,722

TORQUE AND SPEED TRANSMISSION DEVICE

Otto Edward Szekely, Elmira, N. Y., assignor to The Szekely Company, Inc., a corporation of New York Application November 19, 1934, Serial No. 753,755
Renewed April 12, 1937

26 Claims. (Cl. 74—328)

This invention relates to improvements in torque and speed transmission devices including speed and torque selector transmitting systems.

One of the features of the present invention is the provision of such a system with a low speed drive train for attaining a quick starting at a high torque delivery, together with a variable ratio transmission for producing the ultimate high speed.

Another feature of the present invention is the provision of a low speed and high torque drive train operative for quickly starting the driven element, together with an automatically variable high speed and low torque transmission for normal driving, together with selector means responsive to the torque demand for determining the operation of said trains.

A further feature of the invention is the provision of a low speed and high torque drive train for producing a quick starting at high torque demand, a high speed and low torque train of variable ratio for producing the normal drive and cooperating with said low speed drive at high torque demands.

Still another feature of the invention is the provision of a low speed and high torque drive, a variable ratio high speed and low torque drive for normal operation independently of the low speed drive, and automatic devices for superseding the low speed drive with the high speed drive at low torque demands, and for varying the ratio in accordance with the torque demand.

A still further feature of the invention is the provision of a low speed and high torque train for producing a constant drive effort and including a clutch which is overrun at higher speeds, together with a variable ratio train including devices for automatically selecting the ratio according to the torque demand, and also including means for disconnecting the trains from the source of power at low speeds of the source.

Still another feature of the present invention is the provision of a low speed and high torque train including a clutch which is overrun at higher speeds, a variable ratio train responsive to the torque demand for driving the driven element at a speed greater than that determined by said low speed train, and a positive and mechanical reverse train, with means for positively disconnecting the high speed and low speed trains when the reverse train is engaged, and vice versa.

A still further feature of the invention is a provision of a low speed and high torque train, a variable ratio train, a reverse train, and a selector structure turning with the driven element and having relatively few and light parts so that the inertia of movement thereof is small.

A still further feature of the invention is the provision of a transmission of the said type which is composed of simple and easily manufactured and assembled parts, and which is capable of use even upon breakage of automatically selecting elements of the drive trains.

With these and other features as objects in view, as will appear in the course of the following specification and claims, an illustrative form of practicing the invention is set out on the accompanying drawings.

In these drawings:

Fig. 1 is a longitudinal upright diametrical sectional view through this illustrative form of construction.

Fig. 2 is a transverse sectional view of the same substantially on line 2—2 of Fig. 1.

Fig. 3 is an upright view of the same substantially on line 3—3 of the same.

Fig. 4 is an upright transverse sectional view of the same substantially on line 4—4 of the same.

Fig. 5 is a detail sectional view, on a larger scale, substantially on line 5—5 of Fig. 4.

Fig. 6 is a longitudinal upright diametrical section, on a larger scale, showing the differentiating gearing and the retarding structures.

Fig. 8 is a view of the parts shown in Fig. 7, substantially on line 8—8 of Fig. 4.

Figure 7:
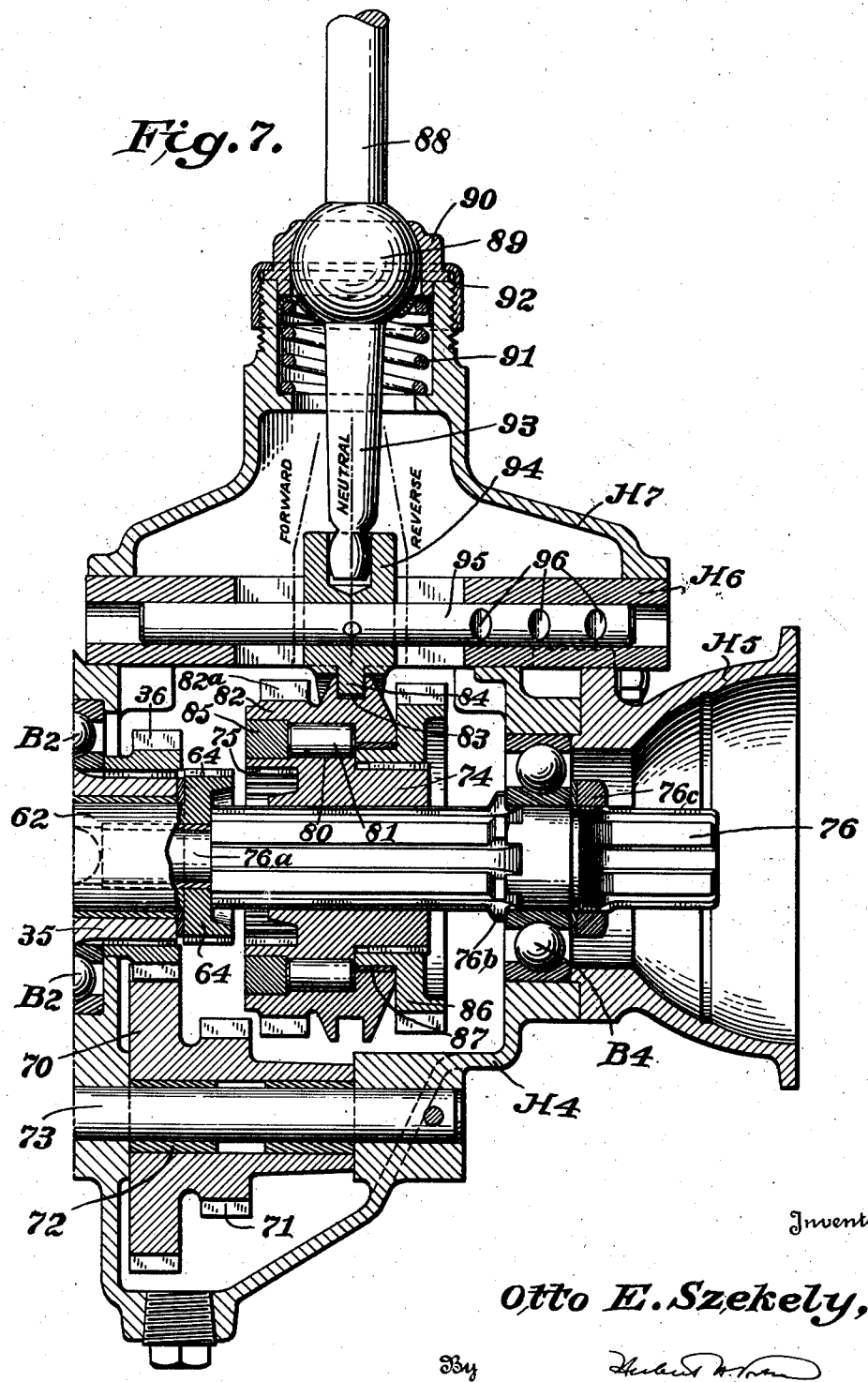
Fig. 7 is a similar view, showing the direction and torque selector assembly.

In these drawings, the engine E has connected thereto the housings H1 and H2, and on these are successively supported the housings H3, H4, and H5 which together form an oil tight closure. The assembly may be supported, also, at other points in any desired manner. The housing H5 is illustrated as having a spherical form for cooperation as a part of the usual universal joint structure. The top of housing H4 is open and receives a plate H6 for the shift control system, and this in turn supports a closing member H7.

The engine E has a flange 10 on the end of its crank shaft which is connected by bolts 11 with the fly wheel 12. A fly wheel ring 13 supports the centrifugal levers 14 by pivots 15. The levers 14 have threaded portions for supporting the centrifugal weights 16 which are threadedly movable thereon and may be locked in adjusted position by lock nuts 17. It will be understood that the ring 13, levers 14, weights 16, and nuts 17 are preferably constructed and preliminarily adjusted to preserve the static and dynamic balance of the system which turns with the engine shaft. The outward centrifugal movement of weights 16 is against the action of the return springs 18, and causes a movement of the annular pressure plate 19 toward the left in Fig. 1. This pressure plate is carried in rotation with the fly wheel by the engagement with a splining member 12a thereof.

A clutch disk 20 extends between surfaces of the fly wheel 12 and pressure plate 19 and is provided with friction material 21 at its faces for engagement with these surfaces. The clutch disk 20 is supported on a collar 22 which is splined to a clutch shaft 23, this clutch shaft having a forward extension 24 supported for rotation in the end of the engine shaft and its flange 10. The clutch shaft 23 extends through the web wall H3a and has an anti-friction bearing B1 for supporting it with respect to this web wall, and is packed by a gland 26.

As shown in Figs. 1, 2, 3, and 6, the clutch shaft 23 has splines for positive driving connection with one end flange 30 of the retarding structure which is illustratively shown as an oil displacement pump of rotative gear type. The pump housing 31 and the other pump flange 32 are connected tightly to the flange 30 by bolts 31a. The end flange 32 has a cage-like extension 33 to which is rigidly connected an apertured end web 34 formed integral with a supporting sleeve 35 which is supported by an anti-friction bearing B2 carried by the housing section H4, and provided at its outer end with splines for fixed driving connection with a torque limit drive gear 36 (Figs. 1, 7, and 8). The first flange 30 of the pump has a cylindrical end flange 37 through the interior of which oil may flow on its way into the pump, passing through ports 38. The flanges 30 and 32 support the pivots 39 for the pump pinions 40 (Figs. 2 and 6) which latter fit closely in corresponding pockets in the housing 31. During operation of the pump as a displacement means, the fluid is discharged through the outlet passages 42 having the threaded restriction plugs 43 therein.

Cooperative with the cylindrical flange 37 are the spaced flanges 44, 44a shown as integral with the web wall H3a. This web wall H3a also is provided, beneath the axis of the shafts, with a passage 45 by which oil may be drawn from the sump S formed by the bottom of the housing section H3.

The pump pinions 40 cooperate with an inner pump gear 46 which is splined to a sleeve 47 journaled on a bearing bushing 47a supported by the clutch shaft 23. The sleeve 47 has a radial end flange 48 and is guided within the end flange 32 by an anti-friction bearing B3. The end 48 carries the pivots 50 for the planet pinions 51 of a differentiating gear train. The small inner sun gear 52 of this differentiating train has a cylindrical internal clutch surface 53 and is connected by splines to the end of the clutch shaft 23. A thrust plate 54 operates between the flange 48 and the sun gear 52 as a spacing member. A large internally cut gear 55 of the differentiating train is fixed to a radial flange 56 of the supporting sleeve 57 which extends within the small sun gear 52 and is provided with clutch surfaces 58 for cooperation with the rollers 59 of this clutch. A bearing bushing 60 is employed for holding the two sun gears in concentric relation. A ring 61 supports the ends of the planet pinion pivots 50 and is connected to the flange 48 by posts 61a from point to point.

The transmission shaft 62 is splined for fixed engagement with the sleeve 57, and has an extension 62a for holding it in axial alignment with the clutch shaft 23, and at the other end is provided with clutch teeth 64 which are operative during forward driving movement.

As shown in Figs. 1, 4, 7, and 8, the torque limit drive gear 36 is in mesh with a large torque counter gear 70 which is formed integral with a small torque counter gear 71, these gears being supported by a bearing bushing 72 on the fixed bearing pin 73 carried by the housing section H4, and illustratively located directly beneath the axis of shaft 62 and turning in a maintained pool of oil so that the lubrication of associated parts is assured.

A direction and torque selector assembly includes a body 74 having clutch teeth 75 cooperative with clutch teeth 64 and being mounted on splines of the tail shaft 76 so that the body 74 may slide axially while turning with the shaft. The end of shaft 76 has an extension 76a within the transmission shaft 62 to assure co-axial alignment of these parts, and is provided with an anti-friction bearing B4 carried by the housing section H4. The tail shaft 76 has abutments 76b engaged with the inner race of the bearing B4, and has a clamping nut 76c likewise engaged with this inner race for assuring the proper axial position of the tail shaft 76.

As shown in Figs. 4 and 7, the exterior of the body 74 has clutch surfaces 80 for cooperation with the clutch rollers 81 of an overrunning clutch which operates, when engaged, to determine the maximum torque and minimum speed ratio of the transmission. An outer body 82 has a cylindrical internal clutch surface for cooperation with the rollers 81 so that the outer body 82 may turned freely in one direction about the axis of the inner body 74, but is detained against such relative rotation in the opposite direction. This outer body 82 has a groove 83 for the shifting fork 84. A closing ring 85 is fixed to the outer body 82 and serves to prevent escape of the rollers 81. This outer body, further, has gear teeth 82a. A reverse gear 86 is held by splines of the inner body 74 and carries a guide bushing 87 located between it and the outer body 82.

The shift lever 88 has a pivot ball 89 which is pressed upward against a socket 90 by a pressure spring 91. The socket 90 is held in position by a threaded clamping collar 92. The lower actuating end 93 of the shift lever extends into a socket piece 94 fixed to the selector rod 95 which has notches 96 therein. Three notches are shown, corresponding to the forward, neutral, and reverse positions of the shift lever 88. These notches cooperate with the detent ball 97 (Fig. 4) which is urged into detaining position by a spring 98.

The reverse idler shaft 100 is mounted in the housing section H4 and has a large gear 101 in plane with and in mesh with the large torque counter gear 70 (Figs. 4 and 8), and also has a small reverse idler gear 102 which is positioned for selective engagement with the reverse gear 86 (position of Fig. 8).

In order to control the action and reaction effects in the pump, so that this effect may be reduced to a minimum, a means is illustrated for preventing the passage of liquid into the pump. As shown in Fig. 5, the outer flange 44 opens into a cavity 110 provided in the web wall H3a, and having a top aperture in communication with the interior of the housing section H3. This aperture may be closed by a valve closure member 111 fixed on a sliding valve stem 112, and normally seated by the valve spring 113. The valve stem 112 is provided with a piston 114 within a cylinder 115 likewise formed in the housing section H3, and closed at its upper end by a plug 116 through which extends the upper end of valve stem 112. A connection 117 leads to the manifold of the engine, so that a reduced pressure prevails above the piston 114 when the engine suction increases. This reduced pressure operates to raise the piston 114 and thereby lift the valve closure member 111 from its seat and permit air to enter, from the interior of housing section H3, into the cavity 110 and thus break the vacuum being created in the rotating pump parts, so that liquid is no longer sucked through the housing passage 45. A connection 118 is also provided for the manual movement of the valve stem 112, and for adjustment of its prevailing position. It will be understood that if this adjustment is so made that the valve closure member 111 is seated during the normal operation of the system, the structure will tend to be "fierce" in its operation so that the transmission system produces an exceedingly rapid acceleration, due to the relative incompressibility of the liquid. On the other hand, if the adjustment be so made that the valve 111 is slightly raised above its seat during normal operation, so that a very small quantity of air is permitted to be drawn in, along with the liquid, a more compressible mixture of liquid and air is present in the pump, and hence the starting is softer and the rate of acceleration is less. This adjustment, therefore, determines the smoothness and rate of acceleration.

The space of cylinder 115 beneath the piston 114 is preferably provided with an air port 119 so that the engine manifold pressure accurately determines the movement of piston 114.

The operation of the system is as follows:

When the tail shaft 76 is at a standstill and the engine E is turning at a low rate of speed, the fly wheel 12 and pressure plate 19 are disengaged from driving relationship to the clutch disk 20. The clutch shaft 23, the pump housing and pump pinion, all parts of the differentiating train, and the torque limit drive gear 36 are at a standstill. If the direction and torque control assembly is in "Forward" position as shown in Fig. 1, the clutch engagement at 64—75 holds the differentiating and pump parts and clutch shaft 23 at a standstill. If the assembly is in "Reverse" position (Fig. 8), the reverse drive train holds the differentiating and pump parts with clutch shaft 23 at a standstill.

To start the forward movement of the tail shaft 76, the assembly is brought into the "Forward" position. The engine is speeded up so that the centrifugal weights 16 operate to cause engagement between the fly wheel 12 and pressure plate 19 with the friction surfaces provided on clutch disk 20. The clutch disk now rotates the clutch shaft 23 in a direction and at a speed determined by the engine movement, and thus the pump structures including the end flanges 30 and 32 and the housing 31 are turned in the same direction and at the same speed, along with the end web 34 and the torque limit drive gear 36. Likewise, the inner differentiating sun gear 52 is rotated at this angular velocity. If the resistance to movement of the tail shaft 76 is great, this tail shaft is driven through the train 36—70—71—82—81—80—74—76, at a low speed and at a high torque effect. Therewith the clutch engagement between teeth 64—75 holds the sleeve 57 and the internally cut gear 55 at the same low speed. The relative movement of the inner sun gear 52 with respect to the outer gear 55 causes the planet pinions 51 to rotate about their pivots 50 and travel with respect to their outer gear 55, causing a movement of the flange 48 and teeth of the inner pump gear 46 at a rate of speed which is one-half the difference between the rates of speed of the two gears 52 and 55. The inner pump gear 46 thus turns in the same direction as the housing 31 but at a lesser angular velocity, and the pump pinions 40 rotate and cause a delivery of fluid. This delivery of fluid is restricted by the plugs 43 in the outlet passages. If nothing but air is being pumped, this retardation is minor and the system is free to turn without exerting any substantial torque effect upon the tail shaft 76 which is sufficient to cause a rotation of this tail shaft.

However, the change in manifold pressure by opening the throttle valve causes the valve closure member 111 to be substantially seated, so that the suction break is no longer present, and liquid is drawn, by the pump, through the inlet passage 45 and through the ports 38 and thus delivered from the pump through the outlet passages 42. The retardation upon the liquid is greater than the retardation upon the gas, and hence there is an effect in the pump which tends to bring the internal pump gear 46 up to the speed of the pump housing, the corresponding reaction being applied to the pump housing itself, and in the direction of its rotation.

This increased speed of the internal pump gear 46 is accompanied by a like increase in the speed of the flange 48 and in the bodily movement of the planet pinion pivots 50, so that these planet pinions are being carried bodily about the axis of flange 48 at a greater rate than that previously determined by the then-existing difference of speeds of the inner and outer gears 52 and 55. This causes a turning movement or torque to be exerted upon the large gear 55 so that a turning effect is produced at the clutch teeth 64—75 tending to move the assembly body 74 and the tail shaft 76 in the same direction as the engine movement. The amount of the torque effect thus delivered is determined by the said action and reaction in the pump (being thus dependent upon the diameters of the pump parts, the restriction in the outlet passage, and the relative proportions of liquid and gas in the fluid being pumped) and upon the relative diameters of the several gears and the effective arms at which the energy is being transmitted.

Since the overrunning clutch rollers 81 are being turned at a minimum speed controlled by the relative gear ratios as described above, the aforesaid drive through the pump system tends to become balanced by the action of the differentiating train so that part of the effective torque is being delivered through the minimum speed train while part is being delivered through the pump and differentiating system. If the torque demanded by the tail shaft 76 is less than the torque which is transmitted through the pump and differentiating system, the torque delivered at the tail shaft is greater than that demanded, and hence the tail shaft velocity tends to increase. If the transmission is employed in an automobile, this increase continues until the resistances opposing a free rotation of the tail shaft 76 (such as wind and road resistance, grades, and friction of parts) raises the demand to the transmitted output through the pump and differentiating system. A point of equivalence is thus automatically attained on the basis of the actual torque demanded at the tail shaft 76 itself. If the transmitted torque is sufficient to bring the tail shaft up to the speed of the engine, then the overrunning clutch elements 53—58—59 engage and prevent the tail shaft from exceeding the angular velocity of the engine. At this time, the pump and differentiating system operate to maintain this maximum speed ratio, and the speed of the tail shaft increases with the engine speed until the engine torque output equals the demand at the tail shaft. This condition may be referred to as "direct drive", as the tail shaft responds in speed exactly with changes in engine speed.

This is the normal condition for operation in an automobile, for example, and the differential train and pump parts turn together at the same angular velocity, in the several anti-friction bearings provided for these parts. The body 74 continues to overrun the gear 82, by the operation of the overrunning clutch. The automobile responds directly in speed to the engine speed as determined by the accelerator pedal.

The employment of the overrunning clutch 53—59—58 preserves the structure against breakage upon excessive load. Thus, in the absence of such a restricting device, a drop of the load at the tail shaft 76 might cause an acceleration of the parts beyond the engine speed: such a condition would arise, for example, in running downhill with torque being transmitted from the automobile to the engine. By providing this overrunning clutch, therefore, the maximum strains are determined, and it is possible to calculate the required size of the parts without difficulty and while affording a desired factor of safety against breakage.

This normal operation continues so long as the torque demanded at the tail shaft 76 maintains its equivalence to the torque transmission through the high speed and low torque train including the pump and differentiating parts. If the automobile encounters a heavy grade, for example, the torque demanded at the tail shaft 76 becomes greater than can be supplied by the engine at the particular speed. The engine therefore tends to slow down if the same throttle opening is continued. Dependent upon the torque curve of the engine, the engine may for a time be able, or may immediately be unable to supply the necessary torque. As soon as this inability occurs, the torque demanded through the pump and differentiating parts causes a slippage in the pump so that the parts thereof no longer turn at the same angular speed, and differentiation occurs in the differentiating gearing so that automatically a new speed and torque ratio is set up which is intermediate between the high speed and low torque ratio at "direct drive" and the low speed and high torque ratio established through the maximum torque train. Since this is produced as a result of the torque demand, the system is fully automatic, and a new ratio is produced when the total torque demand of a system and automobile, as modified by the gear ratio being produced in the differentiating gearing, is again equivalent to the engine speed and torque output. The low speed and torque limit train through gears 36 and 70 is still inoperative, as the body 74 is still overrunning the gear 82.

At an excessively high torque demand, the pump system and differentiating gearing cannot establish a torque ratio which is high enough to attain such equivalence, so that the speed of the body 74 tends to fall below the speed determined through the limit train including gears 36 and 70, and this latter drive now takes charge, and determines a minimum ratio of engine-to-tail shaft speeds, and so long as liquid continues to be pumped in the pump system. If the high speed drive through the pump system should tend to become higher, it is not able to supply the high torque demand and hence slows down to this limit speed ratio.

If a still further and higher demand is made upon the tail shaft 76 than the ratio established at the speed determined by the operation of the limit train including gears 36 and 70, the source of power is further slowed down. The engine however is now operating under conditions which cause a higher suction effect in the intake manifold. This is communicated to the piston 114, and the latter rises and opens the valve closure member 111, thus admitting air to the fluid displacement means, and substantially reducing or terminating the action-reaction effects in the high-speed system, so that the drive continues at the rate determined positively in the low-speed train.

As the demand increases further, the engine speed drops still further. With an internal combustion engine, the torque-speed ratio is usually such that upon decrease below a certain minimum speed, the torque output falls rapidly. At this time, however, the automatic clutch system opens, as the engine speed is no longer sufficient to cause the centrifugal weights 16 to hold this automatic clutch closed. Thus, the transmission system is disconnected from the engine, and the engine cannot be dragged to a standstill.

In order to reverse the movement of the tail shaft 76, the torque and direction selecting system is moved out of "forward" position into "reverse" position (Fig. 8). When the engine is revolving at sufficient speed, the automatic clutch again engages and turns the pump housing and differentiating gearing. The train through these structures is however interrupted by disengagement of the clutch elements 64—75. The rotation of the end flange 34 of the pump structure causes a continued movement of gear 36 and therewith of counter-shaft gear 70 in the same direction as before, but since gears 71 and 82a are out of engagement, this produces no movement of the tail shaft. The operation of moving the assembly into "reverse" position, however, has brought gear 102 of the reverse counter-shaft into mesh with gear 86, so that a drive occurs from gear 36 through gear 70 to reverse gear 101, for turning the reverse counter-shaft, and gear 102 now causes a movement of the gear 86 and thus of the body 74 in the reverse direction, turning the tail shaft 76 with it. It will be noted that this drive ceases when the engine slows down, by reason of the opening of the automatic clutch.

When the selector system is in "neutral" position, all three trains (the high-speed low-torque train through clutch elements 64—75, the low-speed high-torque limit train through gears 71—82, and the reverse train through gears 102—86) are all disconnected. A racing of the engine under these conditions may cause the centrifugal weights to move and cause rotation of the clutch shaft 23, the pump structures, and parts of the differentiating train, but there is no present load on these structures, and the movement is substantially free, and no movement of the tail shaft 76 can be produced.

It will be noted that the system operates entirely automatically when in "forward" position, and that the driver has a normal control of the speed through the operation of the accelerator, and that release of the accelerator permits the pump parts to turn freely, permits the engine to drop to idling speed, and causes an opening of the automatic clutch. Thus, so-called free wheeling is possible with the system, this effect however being terminated immediately upon depression of the accelerator pedal, relative motions of the parts then occurring owing to the compressible mixture passing through the pump system, so that there is smoothness of engagement and absence of excessive strain upon the automatic clutch.

Furthermore, it will be noted that even in the event of rupture or breakage in the liquid supply system, so that the pump parts turn freely with respect to one another, it is possible to maneuver the automobile to a repair point, at the low speed determined through the maximum torque drive, both for forward and reverse movements.

While the invention has been described with respect to a presently preferred embodiment, it will be understood that it may be employed in many ways within the scope of the appended claims

I claim:

1. A power driving system including a driving element, a driven element and transmission means connecting said elements; said transmission means including devices providing a low speed and high torque ratio train connecting the driving and driven elements and including an overrunning clutch, and a train connecting the driving and driven elements and including first devices for operating at inversely variable speed and torque ratios and second devices in said train having relative slippage at a predetermined torque transmission therethrough and cooperating during slippage with said first devices for determining the torque ratio established in said first devices.

2. A system as in claim 1, in which said first devices operate to increase the velocity of the driven element above the velocity of the driving element at a low torque ratio of transmission, and including means for preventing the driven element from turning at a rate greater than a predetermined ratio to said driving element.

3. A power driving system including a driving element, a driven element, and transmission means connecting said elements, said transmission means including a first system providing a low speed and high torque ratio train connecting the driving and driven elements and including an overrunning clutch, and a second transmission system including differentiating gearing having a first member connected to the driving element, and a second member operating through the overrunning clutch upon the driven element, and a third member, said second transmission system also including a fluid pressure pump having parts conected to the driving member and parts connected to the third member and having relative slippage at a predetermined torque transmission therethrough and cooperating during slippage with said first transmission system for determining the torque ratio of transmission from the driving element to the driven element.

4. A power driving system including a driving element, a driven element; differentiating gearing including a large gear connected to the driven element, a small gear connected to the driving element, planet pinion means meshing with said gears, a member rotatable relative to said gears and having pivot means thereon for said planet pinion means; fluid displacement means including parts connected to the driving element and parts connected to said relatively rotatable member, and means for creating a back pressure at said fluid displacement means; and speed reduction gearing connecting the driving element to the driven element and including an overrunning clutch.

5. A power driving system, including a driving element, a driven element; differentiating gearing including a large gear connected to the driven element, a small gear connected to the driving element, planet pinion means in mesh with said gears, and a relatively rotatable member having pivot means for said planet pinion means; retarding means operative between the driving element and said relatively rotatable member tending to cause said element and member to turn at the same speed and permitting slippage therebetween at a predetermined maximum torque; and speed reduction gearing connecting the driving element to the driven element and including an overrunning clutch.

6. A power driving system, including a driving element, a driven element, a low speed and high torque ratio train connecting the driving and driven elements and including an overrunning clutch for permitting the driven element to turn faster than the speed determined by said high torque ratio train, and a variable torque ratio train connecting the driving and driven elements and including devices responsive to the torque demand at the driven element for varying said torque ratio, said variable train including a differentiating gearing having three members, one said member being connected to the driving element, a second said member being connected through the overrunning clutch to the driven element, the third said member being connected through said ratio-varying devices to said driving element.

7. A power driving system for a source having a dropping torque characteristic when the velocity drops below a predetermined minimum, including a driving element, an automatic clutch operated by and responsive to the speed of such source for coupling at a predetermined minimum speed and for uncoupling when the source is turning at less than said minimum speed, a driven element, a low speed and high torque ration transmission system connecting the automatic clutch and driven elements and including an overrunning clutch, and a variable torque ratio transmission system connecting the automatic clutch and the driven element and including gearing for causing the driven element to overrun the driving element of said overrunning clutch at high speed and devices responding to increases of torque demand for successively increasing the ratio of torque transmission and decreasing the ratio of speed transmission by said gearing until said ratio of speed transmission equals the ratio of speed transmission through said low speed train, said systems then operating conjointly so that a torque demand at the driven element which is greater than the torque transmission through both said systems will effect a speed reduction of the engine, said automatic clutch operating to disconnect both said systems from the engine when the torque demand causes the engine speed to be reduced below said predetermined minimum.

8. A power driving system for an internal combustion engine, including a driving element connected to said engine, a driven element, a low speed and high torque ratio train connecting the driving and driven elements and including an overrunning clutch, and a variable ratio train connecting the driving and driven elements and including devices responsive to the torque demand at the driven element for varying said ratio, and means actuated by the engine suction and operating through said devices for controlling the torque transmitted through said variable ratio train.

9. A power driving system including a driving element, a driven element, a torque and drive selecting assembly body connected to the driven element and movable between forward and reverse positions, a first gear connected to said driving element, a second gear revoluble relative to said body in one direction, a first countershaft having gears in mesh with said first and second gears when the body is in forward position and operative for reducing the speed and increasing the torque of the second gear relative to those of the driving element, an overrunning clutch for connecting the second gear and body at a low speed of the body, a variable ratio train connecting said driving element and body and including a direct drive clutch which is connected when the body is in forward position, a third gear fixed on said body, a reversing countershaft having gears thereon in mesh with a gear on said first counter-shaft and with said third gear when the body is in reverse position, and devices for changing the ratio of said variable ratio train.

10. A power driving system, including driving and driven elements, a low-speed and high-torque ratio train connecting the driving and driven elements and including an overrunning clutch, a high speed and low torque ratio transmission including gearing operative at different effective speed and torque ratios for connecting the driving and driven elements and including devices having relative slippage at a predetermined maximum torque transmission and cooperating during such slippage with the gearing for producing an increased torque ratio of transmission therethrough, said transmission including first means for connecting the driving and driven elements preparatory to forward movement and for disconnecting the driving and driven elements, and devices providing a reverse train connecting the driving and driven elements and including means coordinated with said first connecting means for connecting the driving and driven elements only when said first means is disconnected.

11. A power driving system including a driving element, a driven element, and transmission means connecting said elements; said transmission means including devices providing a low speed and high torque ratio train connecting the driving and driven elements and including an overrunning clutch, and a variable torque ratio train connecting the driving and driven elements and including devices having relative slippage at a predetermined maximum torque transmission therethrough and also including devices for preventing said driven element from turning faster than a predetermined ratio with respect to said driving element.

12. A power driving system including a rotatable driving element, a rotatable driven element, a third element rotatable relative to said driving and driven elements, sun gears on said driving and driven elements, planet pinion means carried bodily in rotation with said third element, and braking means including a gear pump having a rotatable housing connected to said driving element, and meshing gears, one of said gears being connected to and driven by said third element, and another of said gears being mounted eccentrically in said housing and driven with said driving member, and means for determining the back pressure of fluid at said gear pump.

13. A power driving system including a driving element, a driven element, and transmission means connecting said elements; said transmission means including a low speed and high torque ratio train driven positively by said driving element and an overrunning clutch connecting said low speed train to the driven element, a gear on said driving element, a gear connectable with said driven element for positively rotating the same with overrunning of said clutch, planet pinion means in mesh with said gears, an element for supporting said planet pinion means for bodily movement independent of said driving and driven elements, and fluid displacement means including devices on said driving element and said support element and means cooperative therewith for determining the torque transmission between said driving element and said supporting element by said fluid displacement means.

14. A power driving system including in combination with a source of mechanical power having a rotatable driving member and including means responsive to the rate of development of power by said source, of a driving element connected to said driving member and rotated thereby, a driven element providing a rotatable output member connected to a load, a low speed and high torque ratio train connecting the driving and driven elements and including an overrunning clutch, a variable ratio train connecting the driving and driven elements for turning the driven element when the torque demand of the load is less than equivalent to the torque output of the source and then operating with overrunning of said clutch, devices included in said variable ratio train for varying said ratio according to the torque demand of the load, and means actuated by said responsive means for controlling the torque transmission through said variable ratio train.

15. A system as in claim 14, including means responsive to the rate of speed of the source and operating to effect a disengagement of the source when the latter moves at less than a predetermined rate of speed whereby to prevent stalling of the source at such low rate of speed.

16. The combination with a source of mechanical power including a rotatable driving member and having a dropping torque characteristic as the velocity drops below a determined value, of a driving element connected to said driving member, a driven element, a low-speed and high-torque ratio transmission connecting the driving and driven elements and including an overrunning clutch, a variable ratio transmission including differentiating gearing and braking devices operative between members of the differentiating gearing for controlling the relative speeds of said differentiating gearing and operative at low-torque demand of said driven element to increase the velocity ratio thereto through said gearing and at high torque demand to increase the torque ratio thereto through said gearing and operative at velocities greater than the velocity ratio through said low-speed transmission to cause the driven element to overrun said clutch, and means actuated in accordance to the power output condition of the source to render the variable ratio transmission inoperative at below a predeterminable minimum velocity of the source without effecting the drive through said low-speed transmission.

17. A power driving system including a driving element, a driven element, speed reduction gearing connecting said elements for causing said driven element to turn at low speed, and a variable ratio second gearing connecting said driving and driven elements for causing the driven element to turn at a higher speed, said second gearing including a fluid pressure control means responsive to the torque demand upon the driven element for determining the operation of said system through said speed reduction gearing and the effective ratio in said second gearing.

18. A power driving system including a driving element, a driven element, a low-speed high-torque mechanical gearing connecting said elements for causing said driven element to turn at low speed, and a second gearing connecting said driving and driven elements for causing the driven element to turn at a higher speed, said second gearing including differentiating gearing for causing said driven element to be driven at the speed of the driving element when the parts of the differentiating gearing turn at the speed of the driving element, and means including a structure carried by the driving element and a structure connected with the differentiating gearing for causing the parts of the differentiating gearing to turn at the same speed.

19. A power driving system including a driving element, a driven element, a low-speed high-torque mechanical gearing connecting said elements for causing said driven element to turn at low speed, and a second gearing connecting said driving and driven elements for causing the driven element to turn at a higher speed, said second gearing including differentiating gearing including small and large sun gears respectively connected to the driving and driven elements for causing said driven element to be driven at the speed of the driving element when the parts of the differentiating gearing turn at the speed of the driving element, and means including a structure carried by the driving element and a structure connected with the differentiating gearing for causing the parts of the differentiating gearing to turn at the same speed.

20. A power driving system including a driving element, a driven element, and gearing for providing at least two mechanical ratios of drive between the said elements; one said ratio being a low-speed high-torque ratio drive for causing the driven element to turn at a low speed and another said ratio being a high-speed low-torque ratio drive for causing the driven element to turn at a high speed, said gearing including differentiating gears which turn relative to one another while driving is being accomplished at said one ratio, and means effective for causing the differentiating gears to turn at the same speed and thereby causing the system to operate at said high speed ratio, said means including elements which slip relative to one another when the torque demand at the driven element is in excess of a predetermined maximum.

21. A power driving system as in claim 20, in which the means comprises fluid displacement means and means for determining the back pressure upon said fluid displacement means.

22. A power driving system including a driving element, a driven element, and gearing for providing at least two mechanical ratios of drive between the said elements; one said ratio being a low-speed high-torque ratio drive for causing the driven element to turn at a low speed and another said ratio being a high-speed low-torque ratio drive for causing the driven element to turn at a high speed, said gearing including differentiating gears which turn relative to one another while driving is being accomplished at said one ratio, clutch means connected to the differentiating gears for preventing a first gear thereof turning faster than a second gear thereof and permitting said second gear to turn faster than said first gear whereby the relative rotation is permitted while driving at said one ratio, and means effective for causing the differentiating gears to turn at the same speed.

23. A power driving system including a driving element, a driven element, and gearing connecting said elements; said gearing including means for connecting the elements through a low-speed high-torque ratio mechanical drive and also including a differentiating gearing with gears which is effective when its gears turn at the same speed for establishing a high-speed low-torque ratio mechanical drive between said elements, means for limiting the relative rotation of the gears of said differentiating gearing, and means responsive to the power demand at said driving element for releasing said means.

24. A power driving system including a prime mover having a decreasing torque characteristic at successively lower speed, a driving element connected to said prime mover, a driven element, and gearing connecting said elements; said gearing including a low-speed high-torque ratio mechanical drive between said elements and a high-speed low-torque ratio mechanical drive between said elements, said latter drive including relative speed restricting means which is effective when engaged for causing the driven element to be actuated through said high-speed ratio drive and when released to permit the actuation of said driven element through said low-speed drive, and means responsive to the speed and power demand at said prime mover for releasing said restricting means when the load demand upon said driven element is greater than a predetermined maximum.

25. A power driving system including an internal combustion engine having a supply manifold, a driving element connected to said engine, a driven element, and gearing connecting said elements; said gearing including a low-speed high-torque ratio mechanical drive between said elements and a high speed low-torque ratio mechanical drive between said elements, said latter drive including means which is effective when engaged for causing the driven element to be actuated through said high-speed ratio drive and when released to permit the actuation of said driven element through said low-speed drive, and means responsive to the pressure in said manifold for releasing said first mentioned means when said pressure attains a predetermined ratio to atmospheric pressure.

26. A power driving system including a driving element, a driven element, speed reduction gearing connecting said elements for causing said driven element to turn at low speed and including an overrunning clutch for permitting the driven element to turn faster than the ratio of drive through said gearing, and a variable ratio second gearing having a differentiating gearing including parts connected to said driving and driven elements and a further part driven at a speed dependent upon the difference of speeds of said driving and driven elements, and means connected to said further part and to said driving element for controlling the relative speed thereof.

OTTO EDWARD SZEKELY.